United States Patent
Dow et al.

(10) Patent No.: US 9,229,756 B2
(45) Date of Patent: *Jan. 5, 2016

(54) USER DATAGRAM PROTOCOL (UDP) PACKET MIGRATION IN A VIRTUAL MACHINE (VM) MIGRATION

(71) Applicant: International Business Machines Corporation, Armonk, NY (US)

(72) Inventors: Eli M. Dow, Norwood, NY (US); James P. Gilchrist, Poughkeepsie, NY (US); Steven K. Schmidt, Essex Junction, VT (US); Jessie Yu, Wappingers Falls, NY (US)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 14/469,997

(22) Filed: Aug. 27, 2014

(65) Prior Publication Data

US 2014/0366029 A1    Dec. 11, 2014

Related U.S. Application Data

(63) Continuation of application No. 14/090,523, filed on Nov. 26, 2013, now Pat. No. 8,910,164, which is a continuation of application No. 13/690,135, filed on Nov. 30, 2012, now Pat. No. 8,910,162.

(51) Int. Cl.
*G06F 9/455* (2006.01)
*H04L 29/06* (2006.01)
*G06F 9/48* (2006.01)

(52) U.S. Cl.
CPC ............ *G06F 9/45533* (2013.01); *G06F 9/455* (2013.01); *G06F 9/45558* (2013.01); *G06F 9/4856* (2013.01); *H04L 69/164* (2013.01); *G06F 2009/4557* (2013.01)

(58) Field of Classification Search
None
See application file for complete search history.

(56) References Cited

U.S. PATENT DOCUMENTS

| | | | |
|---|---|---|---|
| 8,281,013 B2 | 10/2012 | Mundkur et al. | |
| 2007/0061492 A1 | 3/2007 | Van Riel et al. | |
| 2011/0145471 A1* | 6/2011 | Corry et al. | 711/6 |
| 2011/0268113 A1* | 11/2011 | Suzuki et al. | 370/389 |
| 2012/0030674 A1 | 2/2012 | Mundkur et al. | |
| 2012/0137287 A1* | 5/2012 | Pang et al. | 718/1 |
| 2013/0031544 A1* | 1/2013 | Sridharan et al. | 718/1 |

OTHER PUBLICATIONS

Peter Mell et al., "The NIST Definition of Cloud Computing," Version 15; p. 1-2; Oct. 7, 2009.

* cited by examiner

*Primary Examiner* — Dong Kim
(74) *Attorney, Agent, or Firm* — Cantor Colburn LLP; Steven Chiu

(57) ABSTRACT

Embodiments of the invention relate to receiving, by a first processor comprising a processing device, an indication that a migration of a virtual machine from the first processor to a second processor is to occur. The first processor transmits user datagram protocol (UDP) packets intended for the virtual machine to the second processor based on the indication. A signal is transmitted to the virtual machine to enter an offline state, wherein the offline states comprises a transfer of at least one of a central processing unit (CPU) state and a memory state, and wherein the virtual machine is configured to halt a processing of the UDP packets in response to receiving the signal. The virtual machine is reactivated once the migration of the virtual machine from the first processor to the second processor is complete. The virtual machine is instructed to resume the processing of the UDP packets.

1 Claim, 5 Drawing Sheets

USER DATAGRAM PROTOCOL (UDP) PACKET MIGRATION IN A VIRTUAL MACHINE (VM) MIGRATION

CROSS-REFERENCE TO RELATED APPLICATION

This application is a continuation of U.S. application Ser. No. 14/090,523 (Dow et al.), filed on Nov. 26, 2013, which is a continuation of U.S. application Ser. No. 13/690,135 (Dow et al.), filed on Nov. 30, 2012, which are herein incorporated by reference in their entirety.

BACKGROUND

The present invention relates to management of virtual machines (VMs), and more specifically, to a user datagram protocol (UDP) packet migration in a virtual machine (VM) migration.

Providers of cloud computing have the competing tasks of providing desired performance for consumers or end users while also efficiently allocating the resources used to provide services to consumers. The resources may be dynamically allocated by the provider to help achieve these goals. Accordingly, a hardware platform may host a plurality of virtual machines, wherein each virtual machine corresponds to a consumer. Efficient use of the hardware platform resources dictates that the provider place as many virtual machines on the platform as possible without compromising the consumer's use of the virtual machine and experience. It may be desirable to move or migrate a virtual machine from one hardware platform to another to ensure that the customer is not adversely affected by changes in resources for the virtual machines.

Environments based on the Transmission Control Protocol (TCP) are able to continue working through a migration because TCP windows are generally longer than the "offline" portion of a virtual machine migration process that suspends all input/output (I/O) and guest processing while a final processing state and other miscellaneous data are sent to a remote host where execution is subsequently resumed. Another network protocol is the user datagram protocol (UDP) which does not include guarantees regarding retry or ordering as compared to TCP.

SUMMARY

An embodiment is directed to a method comprising receiving, by a first processor comprising a processing device, an indication that a migration of a virtual machine from the first processor to a second processor is to occur. The method further comprises transmitting, by the first processor, user datagram protocol (UDP) packets intended for the virtual machine to the second processor based on the indication. The method further comprises transmitting a signal to the virtual machine to enter an offline state, wherein the offline states comprises a transfer of at least one of a central processing unit (CPU) state and a memory state, and wherein the virtual machine is configured to halt a processing of the UDP packets in response to receiving the signal. The method further comprises reactivating the virtual machine once the migration of the virtual machine from the first processor to the second processor is complete. The method further comprises instructing the virtual machine to resume the processing of the UDP packets.

An embodiment is directed to an apparatus comprising at least one processing device, and memory having instructions stored thereon. The instructions, when executed by the at least one processing device, cause the apparatus to receive an indication that a migration of a virtual machine from the apparatus to a processor is to occur. The instructions, when executed by the at least one processing device, cause the apparatus to transmit user datagram protocol (UDP) packets intended for the virtual machine to the processor based on the indication. The instructions, when executed by the at least one processing device, cause the apparatus to transmit a signal to the virtual machine to enter an offline state, wherein the offline states comprises a transfer of at least one of a central processing unit (CPU) state and a memory state associated with the virtual machine, and wherein the virtual machine is configured to halt a processing of the UDP packets in response to receiving the signal. The instructions, when executed by the at least one processing device, cause the apparatus to receive a second signal indicating that the migration of the virtual machine from the apparatus to the processor is complete. The instructions, when executed by the at least one processing device, cause the apparatus to instruct the virtual machine to resume the processing of the UDP packets based on the second signal.

An embodiment is directed to a computer program product comprising a computer readable storage medium having computer readable program code embodied therewith. The computer readable program code comprises computer readable program code configured for receiving, by a first hypervisor associated with a first processor, an indication that a migration of a virtual machine from the first processor to a second processor is to occur. The computer readable program code is configured for causing, by the first hypervisor, the first processor to transmit user datagram protocol (UDP) packets intended for the virtual machine to a second hypervisor associated with the second processor based on the indication. The computer readable program code is configured for causing, by the first hypervisor, the first processor to transmit a signal to the virtual machine to enter an offline state, wherein the offline states comprises a transfer of at least one of a central processing unit (CPU) state and a memory state, and wherein the virtual machine is configured to halt a processing of the UDP packets in response to receiving the signal. The computer readable program code is configured for reactivating the virtual machine once the migration of the virtual machine from the first processor to the second processor is complete. The computer readable program code is configured for instructing the virtual machine to resume the processing of the UDP packets.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Figure 1:
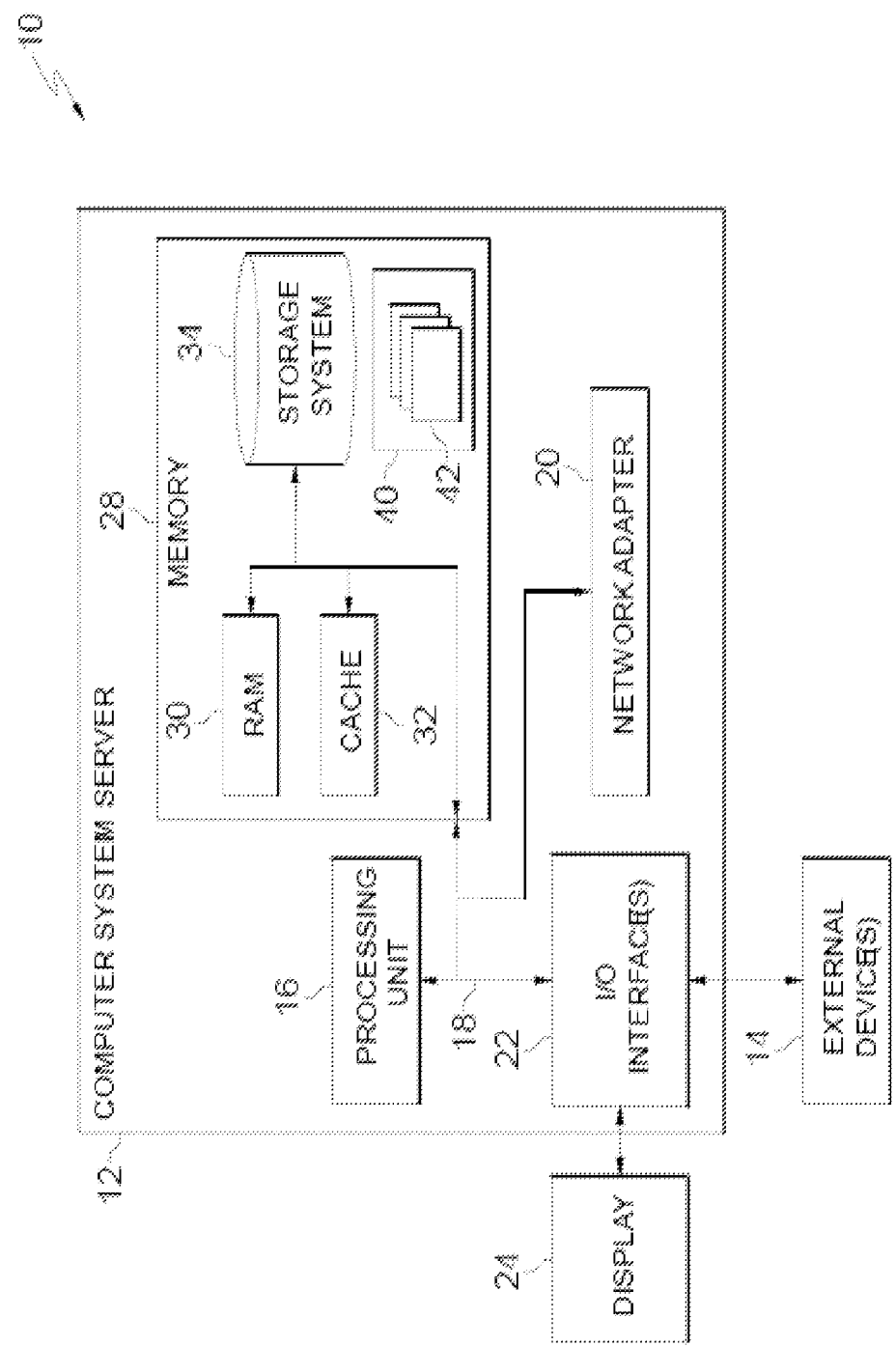
FIG. 1 depicts a cloud computing node according to an embodiment of the present invention.

Embodiments described herein are directed to virtual machine (VM) migration in computing environments that utilize the user datagram protocol (UDP) as a basis for transmitting or receiving data. In an embodiment, a hypervisor buffers UDP packets intended for a VM that has been placed in an offline state during a migration of the VM from a first processor to a second processor. When migration of the VM is complete, the hypervisor forwards the buffered UDP packets to a hypervisor executing on the second processor for processing by the migrated VM. In this manner, UDP packets are not lost during, or as a result of, the migration.

In an embodiment a signal is sent to a hypervisor indicating that a VM is about to be migrated. Based on receiving the signal, the hypervisor performs any migration that can be performed online where the VM remains responsive to the outside world. At the point in time when the hypervisor or VM determines that the VM must go into an offline phase of the migration (e.g., a phase where the VM is not performing computation and is having a critical execution state such as a central processing unit or "CPU" state and or a memory state being transferred), the hypervisor buffers inbound UDP packets intended for the migrating VM. In an embodiment, before entering the offline phase of migration, the hypervisor sends a signal (e.g., inband or out of band) to the VM under migration to halt processing of UDP packets. When the migration has completed, the hypervisor then retransmits the UDP packets intended for the VM to a new hypervisor executing the migrated VM. The VM is then reactivated on the remote side, where it resumes execution and the retransmitted UDP packets are delivered. In an embodiment where the VM had been instructed to buffer UDP packets and not process them, the hypervisor instructs the VM (e.g., using an inband or out of band signal) to normally operate on UDP packets after having optionally reordered its current buffer before processing. The UDP packets may be buffered in kernel or userspace memory in the guest or hypervisor.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed (e.g., any client-server model).

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via I/O interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
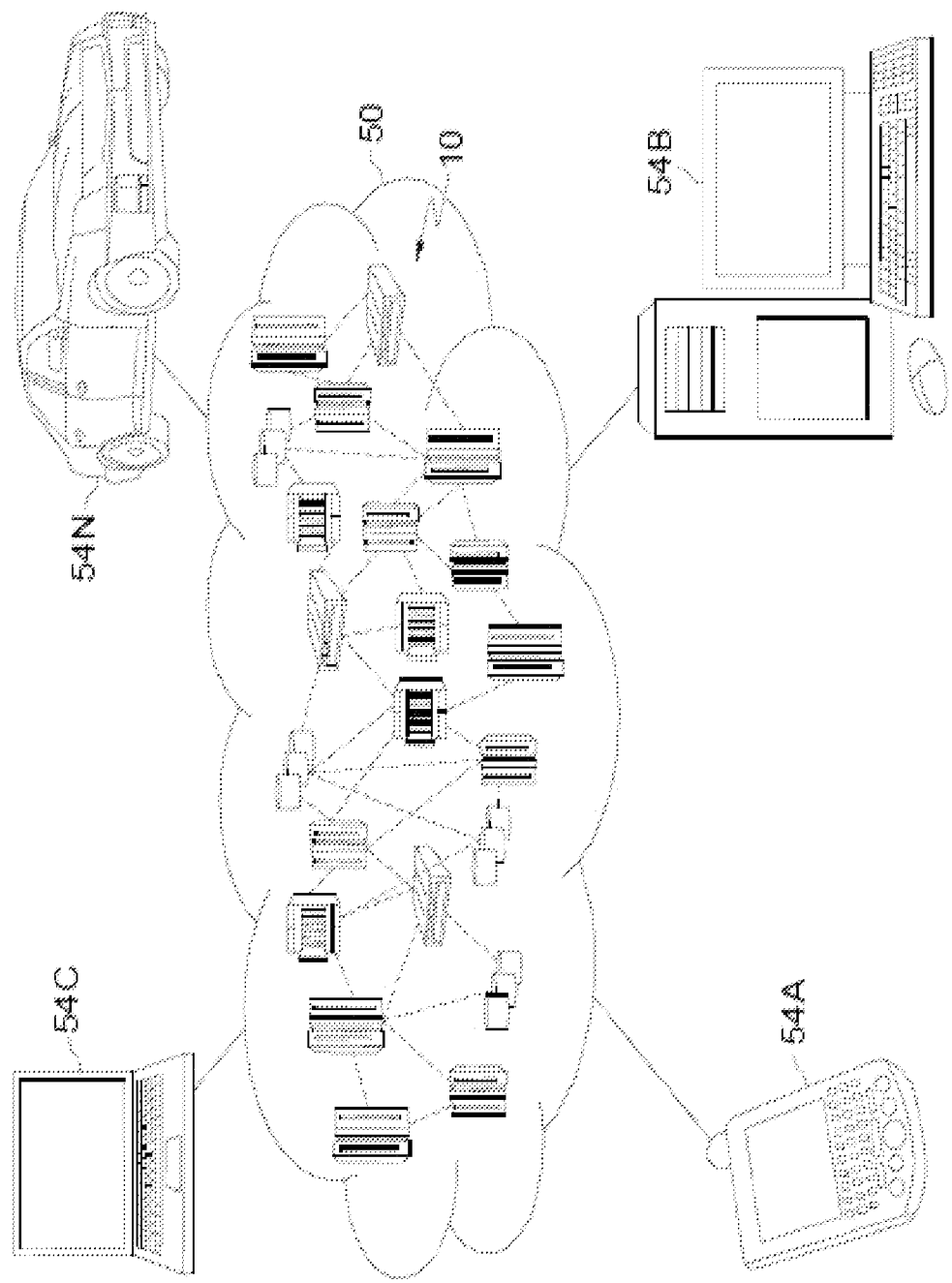
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
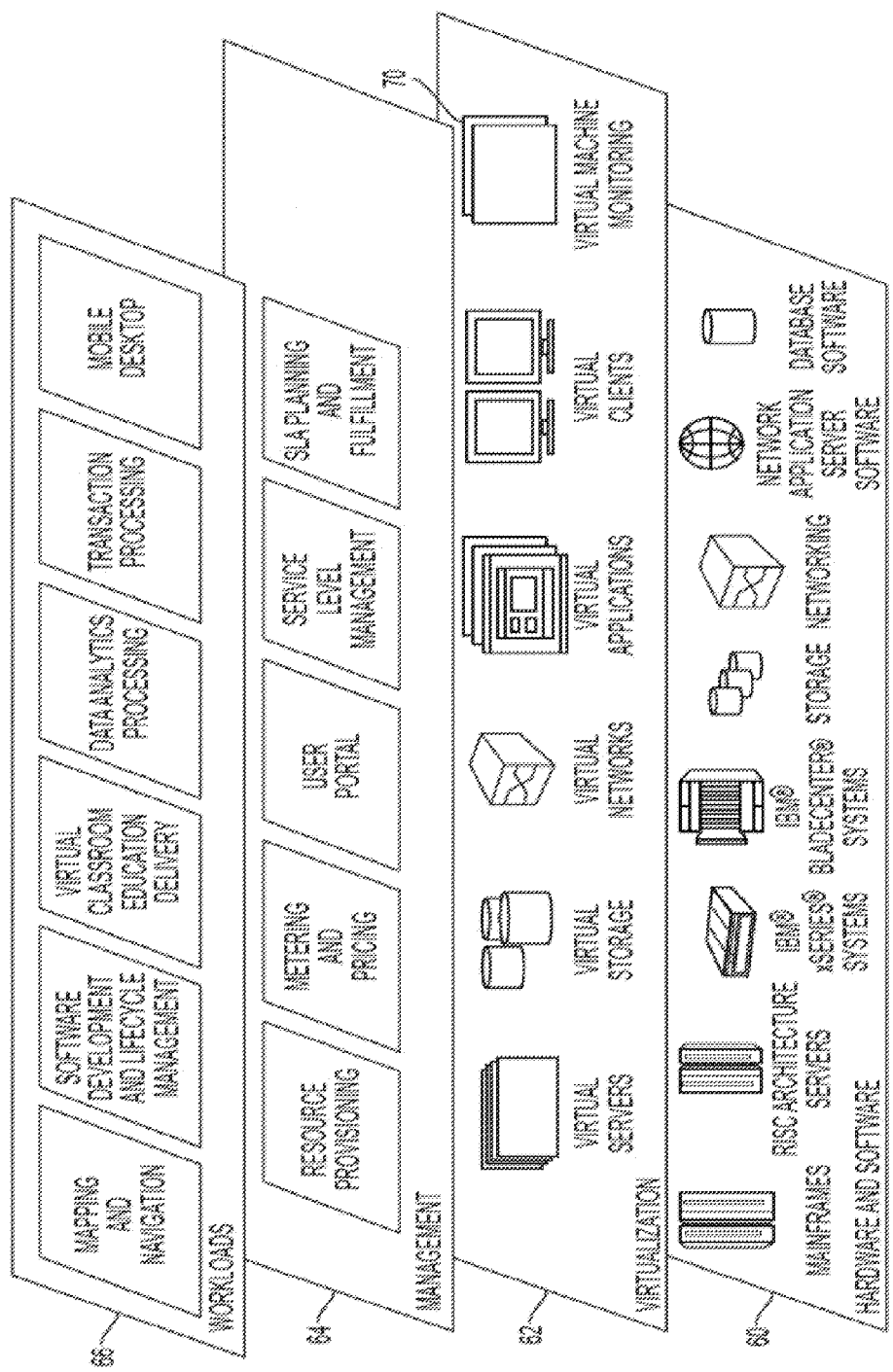
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide)

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security (not shown) provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and a mobile desktop for mobile devices (e.g., 54A, 54C, and 54N, as well as mobile nodes 10 in cloud computing environment 50) accessing the cloud computing services.

In one embodiment, one or both of the hardware and software layer 60 and the virtualization layer 62 may include edge components, such as a web server front end and image cache, as well as an image library store, e.g., in a high-performance RAID storage area network (SAN). In an exemplary embodiment, an application, such as a virtual machine monitoring application 70 in the virtualization layer 62, may implement a process or method for migrating one or more virtual machines; however, it will be understood that the application 70 may be implemented in any layer. In some embodiments, the application 70 may buffer packets intended for a migrating virtual machine and may deliver the buffered packets once the migration is complete.

Figure 4:
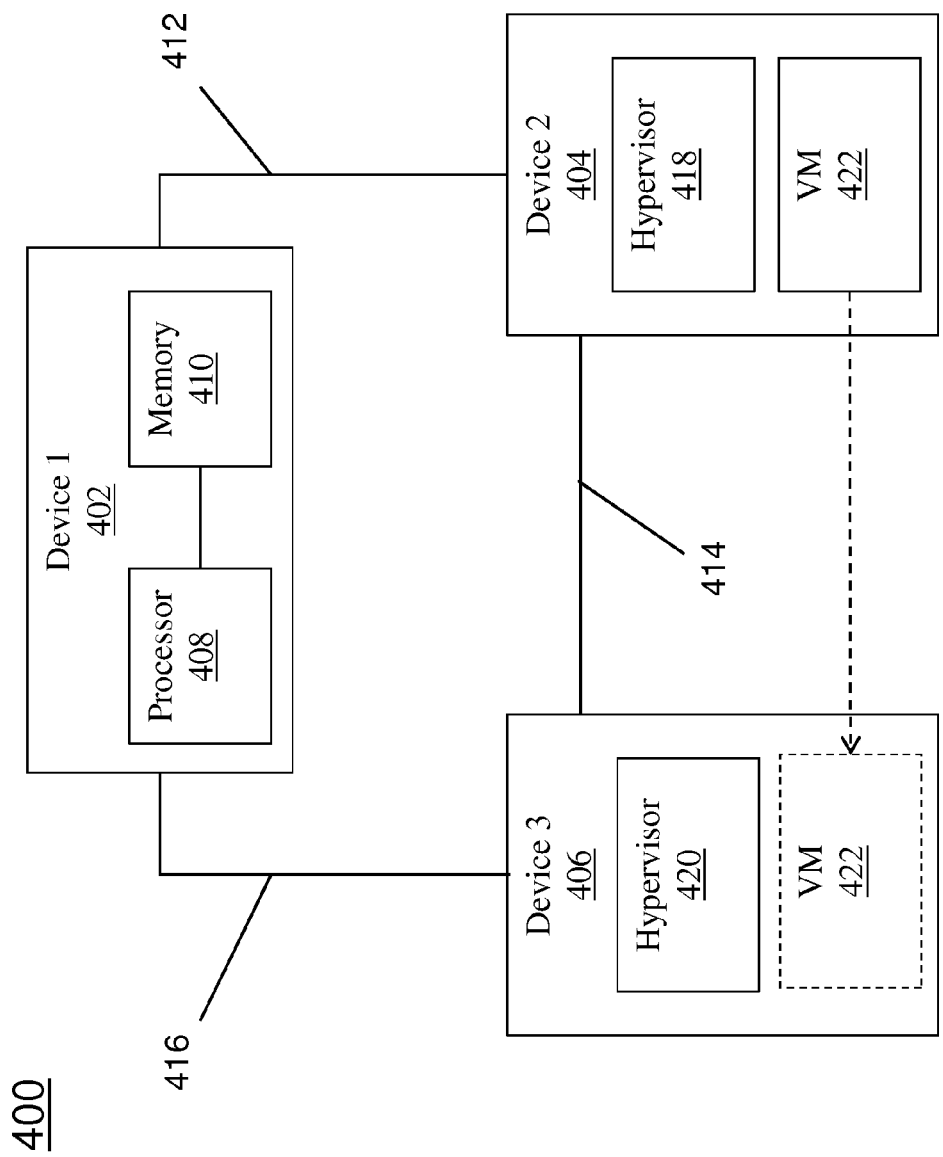
FIG. 4 illustrates a computing system for migrating a virtual machine in accordance with an embodiment.

Turning now to FIG. 4, a computing system or environment 400 in accordance with an embodiment is shown. The system 400 may be indicative of a cluster or work group.

The system 400 includes three devices, device 1 402, device 2 404, and device 3 406. The devices 402, 404, and 406 may be configured to communicate with one another. For example, the devices 402, 404, and 406 may be configured to communicate with one another over wired or wireless connections. While the system 400 is shown as including three devices, in some embodiments more or fewer than three devices may be included. In some embodiments, one or more of the devices 402, 404, and 406 may include, or be associated with, one or more of the entities described above in connection with FIG. 1.

One or more of the devices 402, 404, and 406 may include one or more components. For example, the device 402 is shown in FIG. 4 as including a processor 408 and memory 410. The memory 410 may be configured to store data or information. The memory 410 may have instructions stored thereon that, when executed by the processor 408, cause the device 402 to perform one or more methodological acts, such as those described herein. In some embodiments, the device 402 may include more than one processor 408. The device 402 may include additional components not shown in FIG. 4. For example, the device 402 may include a transceiver to facilitate communications with the devices 404 and 406.

The device 402 is shown in FIG. 4 as being coupled to the device 404 via a link 412. The device 404 is shown in FIG. 4 as being coupled to the device 406 via a link 414. The device 406 is shown as being coupled to the device 402 via a link 416. In some embodiments, one or more of the links may be optional. For example, if link 416 is omitted, then the device 402 and the device 406 might not communicate with one another, or may communicate with one another via the device 404 serving as an intermediary or router of communications between the devices 402 and 406.

One or more of the links 412, 414, and 416 may correspond to a transmission path for a packet (e.g., a UDP packet). The links 412, 414, and 416 may be used to share or transfer information or data from a first device to a second device. Such transfer may take place in response to, or based on, a machine migration (e.g., virtual machine migration).

In some embodiments, one or more of the devices or machines 402, 404, and 406 may include a hypervisor. For example, as shown in FIG. 4, the device 404 includes a hypervisor 418, and the device 406 includes a hypervisor 420.

Assuming a migration, such as a migration of data and/or processing state associated with a virtual machine (VM) or guest 422, from the device 404 to the device 406, the hypervisor 418 may receive a signal indicating that the VM 422 is about to be migrated. The hypervisor 418 may opt to perform any migration that may be considered to be "online" where the VM 422 remains responsive to the outside world.

At a time when the hypervisor 418 or VM 422 determines that the VM 422 must go into an offline phase of the migration, where the offline phase of the migration may correspond to the VM 422 not performing computations and/or having an execution state such as a CPU state or memory state transferred, the hypervisor 418 may buffer inbound packets (e.g., UDP packets) intended for the VM 422. In some embodiments, the hypervisor 418 may send an in-band or out-of-band signal to the VM 422 under migration to halt processing of packets (e.g., UDP packets) before entry of the offline phase.

In some embodiments, an ordering of packets may be provided. For example, if packets are buffered on behalf of the migrating VM 422, the packets may be buffered in order, such that when the VM 422 resumes operation or returns online following the migration, the packets are presented to the VM 422 in sequence. In this manner, efficiency may be enhanced by minimizing or eliminating the amount of packet re-ordering that needs to be undertaken by the VM 422.

When migration has completed, the hypervisor 418 may retransmit the buffered packets intended for the VM 422 to the hypervisor 420 for delivery. Alternatively, the packets may be provided to the hypervisor 420 as the migration of the VM 422 from the device 404 to the device 406 is occurring.

The VM 422 may be reactivated on the remote machine (e.g., device 406), whereby the VM 422 may resume execution and the packets that were buffered (if any) may be provided to the VM 422 for processing. If the VM 422 had been instructed to not process packets prior to entry of the offline phase, the hypervisor 418 may signal or instruct (in-band or out-of-band) the hypervisor 420 and/or the VM 422 to normally operate on such packets, potentially after having reordered such packets.

In some embodiments, packets may be buffered in a kernel or user-space memory in a VM/guest (e.g., VM/guest 422) or a hypervisor (e.g., hypervisor 418).

Figure 5:
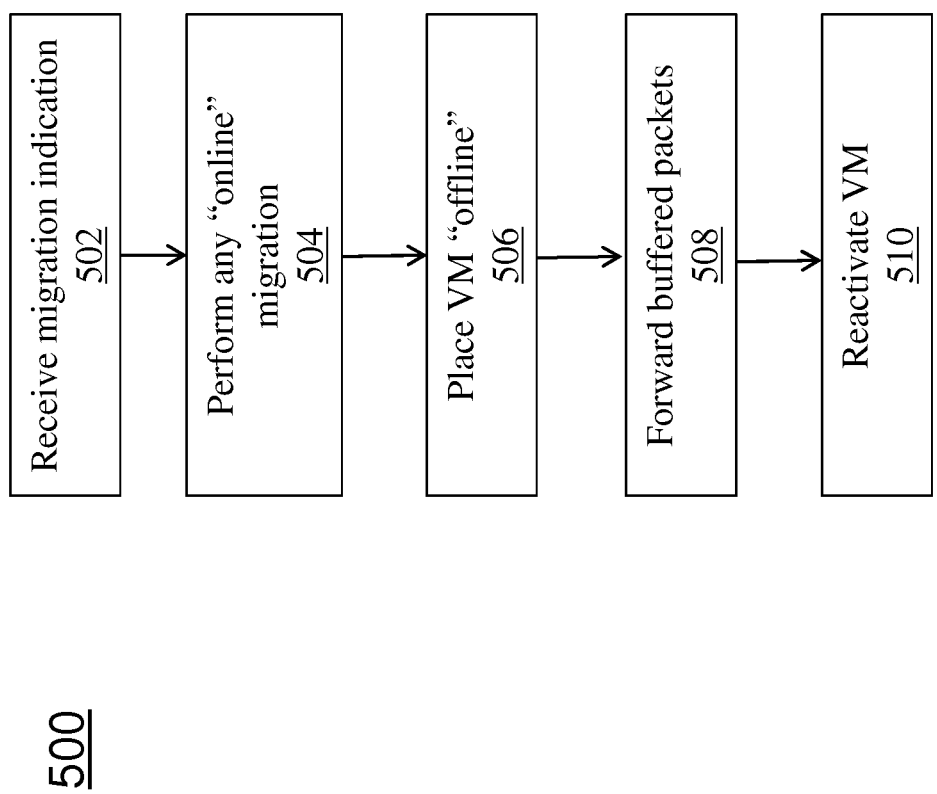
FIG. 5 illustrates a flow chart of a process for providing data packets to a migrating virtual machine in accordance with an embodiment.

Turning now to FIG. 5, a flow chart of an exemplary method 500 is shown. The method 500 may be executed in connection with one or more systems, devices, or components, such as those described herein. In some embodiments, the method 500 may be executed in connection with the application 70 of FIG. 3. The method 500 may be executed in order to migrate a VM or guest from a first location (e.g., a first device or machine) to a second location (e.g., a second device or machine).

In block 502, a migration indication may be received. The migration indication may be received by, e.g., a hypervisor associated with the first location. The migration indication may be received for any number of reasons. For example, a determination may be made that the second location provides for more reliable or less expensive computing resources, for purposes of load balancing, etc.

In block 504, the hypervisor associated with the first location may perform any migration considered online where the VM remains responsive to the outside world or one or more inputs, optionally based on the indication of block 502.

In block 506, the hypervisor associated with the first location may place the VM in an offline state. As part of block 506, the hypervisor associated with the first location may buffer inbound packets intended for the VM. As part of block 506, the hypervisor associated with the first location may instruct the VM to halt processing of packets. As part of block 506, the migration of the VM may occur.

In block 508, the hypervisor associated with the first location may forward or transmit any packets that it may have buffered as part of block 506. The hypervisor associated with the first location may: (1) forward the packets to the VM at the second location, or (2) may forward the packets to a second hypervisor associated with the second location for forwarding to the VM.

In block 510, the VM may be reactivated at the second location once the migration is complete. As part of block 510, the hypervisor associated with the first location may instruct the hypervisor associated with the second location or the VM to process any packets that may have been subject of the "halt" of block 506.

The method 500 is illustrative. In some embodiments, one or more of the blocks (or a portion thereof) may be optional. In some embodiments, the blocks may execute in an order or sequence that is different from what is shown in FIG. 5. In some embodiments, one or more additional blocks not shown may be included.

Technical effects and benefits include increasing or enhancing resiliency of one or more computing devices, such as UDP based servers when running on a virtualized platform. Such servers may be operative in connection with, e.g., the Network Time Protocol (NTP), the Dynamic Host Configuration Protocol (DHCP), the Voice over Internet Protocol (VoIP), etc.

Aspects of the disclosure may be implemented in connection with high performance networks, or in environments where performance trumps the need for strict ordering of data packets. Aspects of the disclosure may be exploited or implemented in environments where servers are subject to large loads (e.g., a large number of client computers and/or a large volume of data), or where servers are migrated frequently. For example, such migration may take place in cloud data centers during load balancing or other migration operations that may reduce cost by moving computation activities to where the computation is inexpensive.

Aspects of the disclosure may be implemented in connection with, e.g., point of sale (POS) systems, accounting systems, database systems, telephone and voice over internet protocol (VoIP) systems, etc.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

Further, as will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, radio frequency (RF), etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method comprising:
   receiving, by a first processor comprising a processing device, an indication that a migration of a virtual machine from a first hypervisor associated with the first processor to a second hypervisor associated with a second processor is to occur;
   transmitting a first signal from the first hypervisor to the virtual machine to enter an offline state, wherein the offline states comprises a transfer of a central processing unit (CPU) state and a memory state to the second hypervisor, and wherein the virtual machine is configured to halt a processing of user datagram protocol (UDP) packets in response to receiving the first signal;
   buffering UDP packets intended for the virtual machine in an userspace memory by the first hypervisor based on the virtual machine entering the offline state, wherein the UDP packets are not received in order, but are buffered in order;
   buffering an additional UDP packets intended for the virtual machine in a kernel space of the first hypervisor based on the virtual machine having entered the offline state, wherein the additional UDP packets are not received in order, but are buffered in order:
   receiving a second signal indicating that the migration of the virtual machine from the first hypervisor associated with the apparatus to the second hypervisor associated with the processor is complete;
   transmitting the buffered UDP packets and the additional buffered UDP packets to the second hypervisor associated with the processor, wherein the transmission of the buffered UDP packets and the additional buffered UDP packets to the second hypervisor is based on the ordering of the UDP packets and the additional buffered UDP packets to enable the virtual machine to process the buffered UDP packets and the additional buffered UDP packets without having to re-order the UDP packets and the additional buffered UDP packets at the processor; and instructing the virtual machine to resume the processing of the UDP packets and the additional buffered UDP packets based on the second signal.

* * * * *